United States Patent [19]

Chaney et al.

[11] 3,833,078

[45] Sept. 3, 1974

[54] SHORT TURN VEHICLE

[76] Inventors: Ray Owen Chaney; Emsley M. Chaney, both of Rural Rt. No. 2, Sidney, Ohio 45365

[22] Filed: Nov. 13, 1972

[21] Appl. No.: 306,043

[52] U.S. Cl............................ 180/42, 280/96
[51] Int. Cl.............................. B62d 3/12
[58] Field of Search........ 180/42, 43 R, 43 A, 43 B, 180/43 C, 45; 280/91, 93, 96

[56] References Cited
UNITED STATES PATENTS

| | | | |
|---|---|---|---|
| 2,875,842 | 3/1959 | Morrell | 280/93 X |
| 2,913,063 | 11/1959 | Brown | 180/42 |
| 3,087,564 | 4/1963 | Qauyle | 280/91 X |

FOREIGN PATENTS OR APPLICATIONS

| | | | |
|---|---|---|---|
| 226,545 | 1/1960 | Australia | 280/96 |
| 933,999 | 1/1948 | France | 180/43 R |
| 241,798 | 11/1962 | Australia | 280/96 |
| 508,679 | 7/1939 | Great Britain | 180/43 R |
| 242,242 | 12/1962 | Australia | 180/43 A |
| 23,859 | 12/1896 | Great Britain | 280/93 |

*Primary Examiner*—David Schonberg
*Assistant Examiner*—Terrance L. Siemens

[57] ABSTRACT

Steering mechanism comprising a pair of steerable wheels which are rotated by respective eccentric gears that are in turn rotated by a steering bar having gear tooth engaging surfaces which engage and drive the eccentric gears. The steering bar is reciprocated longitudinally by a pinion gear located between the eccentric gears and which is held in engagement with the steering bar by a retaining surface that abuts the opposite side of the steering bar from the pinion gear.

13 Claims, 6 Drawing Figures

3,833,078

SHORT TURN VEHICLE

BACKGROUND OF THE INVENTION

The prior art has taught two general types of vehicles which are capable of turning at approximately 90° angles. In the first type of vehicle one or more of the steerable wheels are power driven. These vehicles having a power driven steerable wheel, are slow moving vehicles, and the mechanism for steering the wheels either does not compensate for the difference in turning radius of the steerable wheels when the vehicle turns about a point, or have a very complicated mechanism for turning the wheels at different angles. Even these complicated and expensive steering mechanisms provide but an inexact adjustment or steering radius for the inside and outside wheels during a turn, with the result that skidding of the wheels occurs during sharp angle turns. Only because these vehicles are slow moving can this skidding action be tolerated.

In another type of vehicle taught by the prior art and which is capable of turning at approximately 90°, none of the steerable wheels are power driven. In this type of vehicle, very complicated steering apparatus has been provided which adjusts the turning radius of the steering wheels so that very little sliding action occurs when the vehicle turns about a point. Because of the complicated nature of the steering mechanism that is required to produce the proper turning radii for the inside and outside wheels for all vehicle turning radii, it has not been feasible to couple the steering mechanism with power driven wheels.

An object of the present invention is the provision of a new and improved vehicle capable of steering at angles of more than 90° without any appreciable sliding of the vehicle wheels during the turn.

Another object of the present invention is the provision of a new and improved steering mechanism that is simple in design, rugged in construction, and inexpensive to manufacture and which rotates the individual wheels of a pair of steerable wheels during sharp angle turns of the vehicles at differing angles which so closely approximate the exact radius of turn experienced by the individual wheels during a vehicle turn, that rubber tires can accommodate any remaining inaccuracy without sliding or scuffing.

A further object of the invention is the provision of a new and improved vehicle capable of turns at more than 90° which is simple in design, rugged in its construction, inexpensive to manufacture, and which optimizes mechanical exactitude with tolerable tire twisting action.

Further objects and advantages of the invention will become apparent to those skilled in the art to which the invention relates from the following description of the preferred embodiments described with reference to the accompanying drawings forming a part of this specification and in which:

DESCRIPTION OF THE PREFERRED EMBODIMENTS

Figure 1:
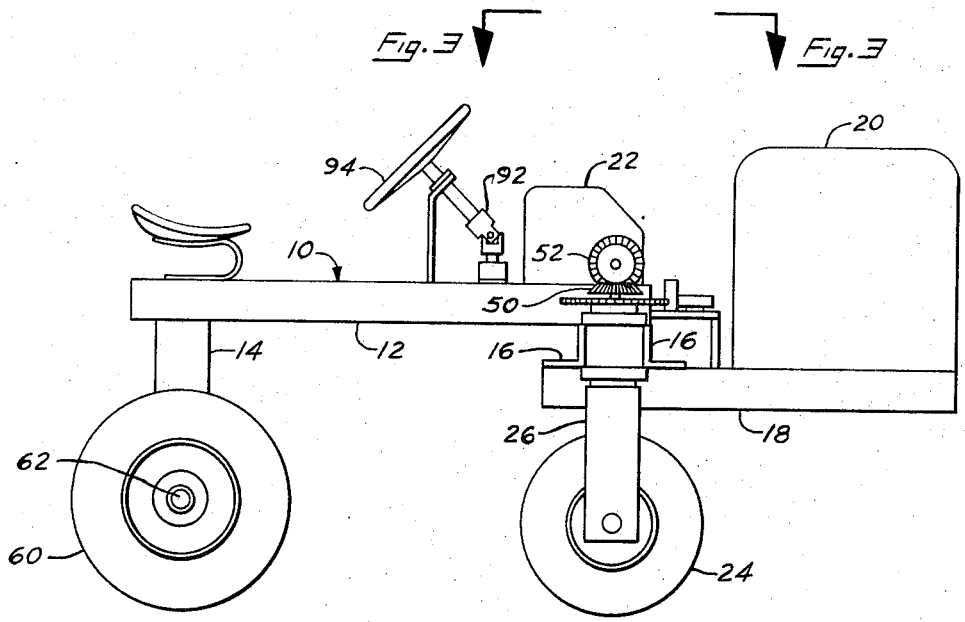
FIG. 1 is a side elevational view of a vehicle embodying principles of the present invention, and which can turn at angles of more than 90° without scuffing of the wheels and at high angular rates of speed.
Figure 2:
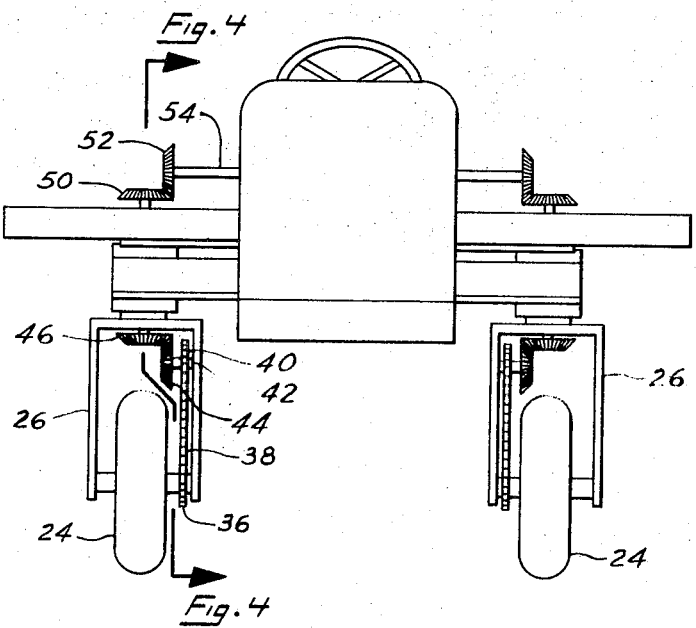
FIG. 2 is a front elevational view of the vehicle shown in FIG. 1.

The vehicle shown in the drawing has two steerable wheels at least one of which is driven and which vehicle comprises: a pair of wheel support shafts mounted for rotation about generally vertical axes, a pair of gears individual ones of which are mounted eccentrically on respective ones of said pair of wheel support shafts, a pinion gear intermediate said eccentrically mounted gears, a steering bar extending past said eccentrically mounted gears and pinion gear, said steering bar having teeth engagement surfaces for the teeth of said eccentric gears and pinion, and a steering bar retaining surface spaced generally opposite and at a fixed distance from said pinion gear for engaging the side of said steering bar opposite from said pinion and holding said bar in engagement therewith.

In detail, the vehicle shown in the drawings comprises a frame generally indicated at 10, having a pair of longitudinal stringers 12, a U-shaped rear axle support 14 at the rear thereof, and a pair of spaced apart lateral angle irons 16 at the front thereof. A pair of forwardly extending angles 18 are affixed to the bottom of the lateral angle irons 16 with their horizontal legs extending inwardly towards each other to support a gasoline engine 20. The gasoline engine 20 has a downwardly projecting drive shaft, not shown, having a V pulley thereon which drives a belt that extends rearwardly between the angle irons 16. A transmission is mounted on top of the longitudinal stringers 12, and the transmission 22 has a downwardly projecting shaft with a V pulley thereon that is driven by the drive belt previously referred to. The vehicle is equipped with a pair of power driven steerable front wheels 24 each of which is rotatably supported by an inverted U-shaped support 26 that is welded to the bottom of a tubular rotatable steering shaft 28. Each tubular shaft 28 is journaled in a respective tubular housing 30, and the tubular housings 30 are spaced apart and are fixed between the spaced lateral angle irons 16. Each tubular shaft 28 is journaled from its tubular housing 30 by means of top and bottom antifriction bearings 32, and the bearings are in turn held in place by annular bearing retaining plates 34 that are fixed to the housing 30 by means of cap screws, not shown.

Each front wheel 24 has a drive sprocket 36 affixed thereto which in turn is driven by a short drive chain 38, the upper end of which is driven by a sprocket 40 mounted on a jack shaft 42 which is parallel to the axis of rotation of the respective front wheel. Each jack shaft 42 is supported inside of the inverted U-shaped wheel support 26, and carries a bevel gear 44 that is driven by a bevel gear 46 that is mounted on the bottom end of a drive shaft 48 that extends upwardly through the tubular steering shaft 28. The upper end of each drive shaft 48 in turn carries a bevel gear 50 that is in mesh with another bevel gear 52 that is affixed to a horizontal drive shaft 54 which extends all the way through and is driven by the transmission 22. Each vertical drive shaft 48 is journaled from its tubular rotatable steering shaft 28 by upper and lower antifriction bearings 56 and 58, respectively. A pair of nonsteerable rear wheels 60 are journaled to opposite ends of a horizontal axle 62 that is mounted on the lower end of the U-shaped rear axle support 14. In the vehicle shown in the drawing, the rear wheels 60 are spaced rearwardly from the front wheels 24 by a distance that is generally twice that of the lateral spacing of the front wheels 24.

Figure 3:
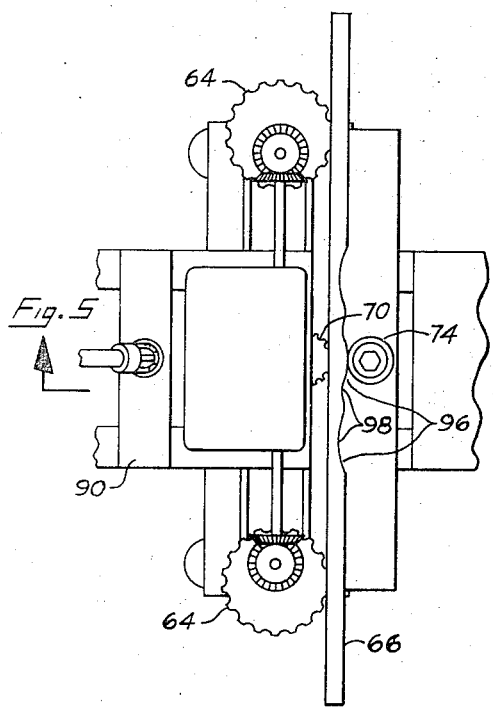
FIG. 3 is a fragmentary plan view taken approximately on the line 3—3 of FIG. 1.
Figure 4:
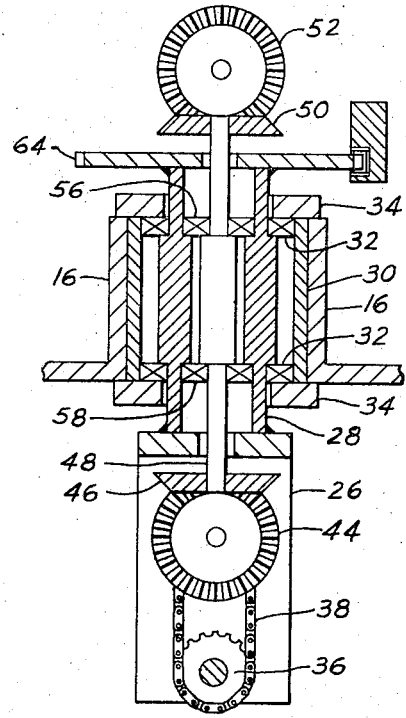
FIG. 4 is a fragmentary sectional view taken approximately on the line 4—4 of FIG. 2.
Figure 5:
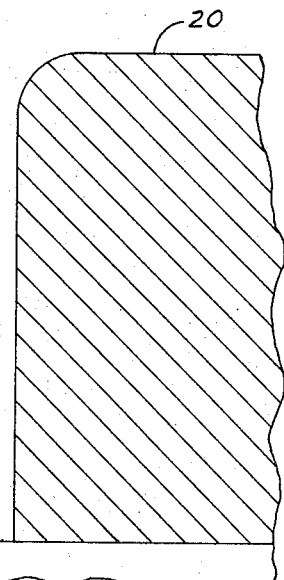
FIG. 5 is a fragmentary sectional view taken approximately on the line 5—5 of FIG. 3.

The front wheels 24 are turned at differing angles relative to each other by new and improved steering mechanism that is best seen in FIGS. 3-5 and which is about to be described. The upper end of each tubular steering shaft 28 is provided with an eccentric sprocket gear 64. While any type of eccentric gear can be used, sprocket gears have been shown in as much as they have a deeper working depth circle and will accommodate a greater movement of the gearing toward and away from each other than will some other types of gears. The left hand gear 64 is fixed to the tubular shaft 28 with its geometric center spaced from the axis of rotation of the tubular shaft 28 by a distance equal to one third of the radius of the sprocket 64. The right hand sprocket 64 is fixed to its shaft 28 in a similar but opposite hand manner, with their geometric centers, and their axes of rotation being in a straight line perpendicular to the longitudinal axis of the vehicle when the wheels are in the straight ahead position. The eccentric gears 64 are rotated by a steering bar 66 which engages the front end of the eccentric gears 64, and which has tooth engagement surfaces 68 for receiving the teeth of both sprockets 64. The steering bar 66 is moved lengthwise by a pinion gear 70, which in the embodiment shown, abuts the same rear face of the steering bar 66 as do the eccentric gears 64. In the embodiment shown, the tooth engagement surface 68 for engaging the pinion 70 and eccentric gears 64 is in a straight line, and is made by means of a section of roller chain which is received in a groove 72 in the rear surface of the steering bar 66. The steering bar 66 is held in engagement with the pinion 70 and eccentric gears 64 by a steering bar retaining surface, which in the embodiment shown is provided by an antifriction bearing 74 which abuts the front face of the steering bar 66 and which is journaled about a fixed axis by means of a bolt 76. The bolt 76 is fixed to a transverse angle iron 78 that is welded to the top of the forwardly extending angles 18 which carry the engine of the vehicle. It will be understood that in some instances the position of the pinion and antifriction bearing 74 can be interchanged with respect to the sides of the steering bar which they engage, and that the antifriction bearing 74, while being a preferred form of steering bar retaining surface, could be replaced by a single fixed surface on which the steering bar slides. The pinion 70 is fixed to a shaft 80 that is rotated by a sprocket 82 which is driven by a chain 84, the rear end of which is driven by another sprocket 86. The sprocket 86 is mounted on the bottom end of a rotatable shaft 88 which is supported on a transverse support plate 90, and the upper end of which carries a universal joint 92 that is rotated by the steering wheel 94 of the vehicle.

Two degrees of motion are required of the steering bar 66 in order for the steering bar to remain in a precise engagement with both eccentric gears 64 during a turn of the vehicle. Because the left hand eccentric gear 64 is rotated about a point to the right of its geometric center, and the right hand eccentric gear is rotated about a point to the left of its geometric center, the distance from the steering bar 66 to the center of rotation of the left hand eccentric gear 64 decreases during a left hand turn while the distance from the steering bar to the center of rotation of the right hand eccentric gear increases during a left hand turn. This action requires the steering bar to rotate counterclockwise as seen in FIG. 3. Maximum counterclockwise rotation of the steering bar occurs when the wheels are turned at approximately 90° and thereafter further rotation of the wheels rotate the steering bar back to its normal or centered positioned. The opposite is true during a right hand turn. Rotational action of the steering bar, therefore, requires a major valley on either side of the centered position of the steering bar.

The major valley on either side of the centered position of the steering bar must further be contoured in order to accommodate the second degree of motion of the steering bar. The second degree of motion occurs by reason of the fact that the distance of the center of rotation of one eccentric gear to the steering bar at first decreases faster than the rate of increase of the distance from the bar to the center of rotation of the other eccentric gear 64. At approximately a 30° turn of the vehicle, the steering bar 66 moves its greatest distance rearwardly towards the pinion gear 70 and away from the retaining bearing 74. At approximately a 60° turn of the vehicle, the steering bar has moved forwardly to its original position of engagement with the retaining bearing 74. At a 90° turn of the vehicle, the right hand eccentric gear has moved the bar a considerably greater distance forwardly than the left hand eccentric gear has allowed the left hand side of the bar to move rearwardly, so that the center of the steering bar 66 has moved forwardly from its original in-line position. This translational movement of the bar requires two minor valleys 98 in the major valley 96 on the right hand side of the steering bar for left hand turns; and an identical but opposite hand contouring of the steering bar is required for right hand turns of the vehicle. The depth of the major valleys 96 and minor valleys 98 is determined in part by the degree of eccentricity with which the gears 64 are mounted for rotation. When the eccentric gears 64 are mounted for rotation at a distance removed from their geometric centers by one-sixth of their radius, only the major valleys 96 are required, since the translational movement of the bar is within the normal spacing tolerance of gears.

It will be understood that gears have a working depth over which tooth engagement can occur and which provides tolerance in the spacing between gears. This working depth is greater with some type of gearing, as for example when rollers engage the teeth, than can be accommodated by conventional fixed teeth. One type of roller mounting is conveniently provided by a chain that is rigidly held from flexing, and this can be used in some instances as will later be explained. When the center of rotation of the eccentric gears is spaced from their geometric centers by one third of their radius, the translational movement of the steering bar will be appreciable, and will be more than can be accommodated by the normal working depth of some types of gearing. When the translational movement is greater than the normal working depth of the type of gearing utilized, normal tolerances can no longer be utilized to accommodate the translational movement and the minor contouring valleys 98 previously described will be utilized. When the eccentric gears are mounted eccentrically by one half of their radius, the minor valleys will have to be used in substantially all cases, and the depths will be determined by the type of gearing utilized.

In the embodiment shown in FIGS. 1-5, the pitch line of the gearing on the rack is kept in a straight line, and the front side of the steering bar is contoured with the major and minor valleys to accommodate the rotational and translational movement of the steering bar. As previously indicated, rollers have been utilized on the steering bar 66 because they have a greater working depth of engagement, and the rollers have been provided on the steering bar simply and inexpensively by a length of roller chain that is seated in a longitudinal groove 72 on the back surface of the steering bar. The roller chain is rigidly secured to the bar by suitable means, not shown, and the bottom or front end surface of the longitudinal groove 72 holds the chain in a substantially straight line. Tack welding can also be used to prevent separation of the chain from the steering bar. It will be apparent that a roller construction could also be made by mounting the rollers by pins received in suitable openings in the steering bar 66. The embodiment shown in FIGS. 1-5 has its center portion recessed from the front planar surface of the bar, as at 96 and 99, and the eccentric gears 64 hold the bar 66 in engagement with the roller bearing 74. The pinion 70 is positioned rearwardly so that the outer limit of its working depth contacts the pitch line of the teeth on the bar 66 when in its centered position. The recessing of the center portion allows the pinion 70 to be moved forwardly from the position that it would have to occupy if the front face of the steering bar 66 were planar; and the initial translational or rearward movement of the bar 66 is accommodated by the working depth of the pinion 70 as the vehicle is turned out of its in-line position. This allows the valleys 96 and 98 to be more shallow and the steering bar 66 to be held rigidly between the eccentric gears and retaining bearing 74 at all times.

In other instances, however, it may not be desirable to position the pinion 70 so far rearwardly, so that the bar will engage the bottom of the teeth of the pinion 70 before one of the eccentric gears is rotated to its most rearwardly position. Rotation thereafter of the eccentric gear to its most rearwardly position causes the gear to move outwardly from the bottom of the working depth of the teeth of the steering bar. Such a positioning of the pinion 70 with respect to the steering bar 66 allows, the full utilization of the working depth engagement of both the pinion 70 and the eccentric gears to accommodate the greater translational movement of the steering bar. This may provide some backlash during sharp angles of steering, but at the sharp angles, the backlash is less objectionable than in the centered position of the steering gear.

With the steering arrangement above described the degree of exactitude with which the center of turning radius of the individual wheels coincides with the center of the turning radius of the vehicle, varies with the eccentricity of the eccentric gears 64; and the region over which the center of radius of the individual wheels moves, occurs at different distances behind the front steering wheels also depending upon the degree of eccentricity of the gears 64. It appears that when the gears 64 are mounted for rotation at a distance of one third of their radius from their geometric center, the center of radius for the individual wheels lies in a region closely adjacent the center line of the rear axle projected, of a vehicle having a wheel base that is approximately twice the lateral spacing of the steerable front wheels. It also appears that, with such a wheel base, the movement of the center of radius of the individual wheels in front of or rearwardly of its rear axle is a minimum. It further appears that the sliding action produced by the difference between the center of radius of the individual wheels and that of the vehicle is so close that any mismatch is easily handled by the normal pneumatic tire. For vehicles having a wheel base greater than twice the lateral width of the steering wheels, it may be desired to locate the center of rotation of the eccentric gears 64 closer to one half the radius of the gears from their geometric centers. When the center of rotation of the eccentric gears is so located, however, greater translational movement of the steering bar occurs than when less eccentricity is provided in the gears 64. Also, greater depths of the valleys 96 and 98 will be necessary unless a greater amount of backlash between the pinion and the steering bar can be tolerated.

Figure 6:
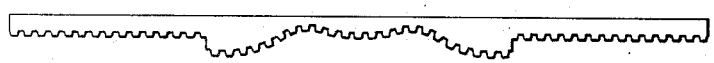
FIG. 6 is a fragmentary view of the steering bar of another embodiment of vehicle which utilizes the principles of the present invention.

As has previously been indicated, the contoured surface comprising the valleys 96 and 98 can be provided on either surface of the steering bar 66, and can in fact be the surface containing the gear teeth that engages the pinion 70. The pinion, of course, could be on the opposite side from the eccentric gear 64, but as shown in the embodiment in FIG. 6, is on the same side as is the teeth which engage the eccentric gear 64. When the teeth are provided on the contoured surface, a precise mesh can be provided between the pinion and the steering bar, and between the steering bar and the eccentric gears, but a more difficult and more expensive machining operation is required. Such an embodiment is shown in FIG. 6. Those portions of the embodiment shown in FIG. 6 which are similar to like portions of the embodiment shown in FIGS. 1-5 are designated by a like reference numeral characterized further in that a suffix is affixed thereto. In the embodiment shown in FIG. 6, the portions of the steering bar which engage the eccentric gears 64 are in a straight line, and only the portion of the steering bar which engages the pinion gear 70 is contoured.

While the invention has been described in considerable detail, we do not wish to be limited to the particular embodiments shown and described, and it is out intention to cover hereby all novel adaptations, modifications, and arrangements thereof which come within the practice of those skilled in the art to which the invention relates, and which fall within the perview of the following claims.

We claim:

1. A vehicle having two steerable wheels at least one of which is driven, said vehicle comprising: a pair of wheel support shafts mounted for rotation about generally vertical axes, a pair of gears individual ones of which are mounted eccentrically on respective ones of said pair of wheel support shafts, a pinion gear intermediate said eccentrically mounted gears, a steering bar extending past said eccentrically mounted gears and pinion gear, said steering bar having teeth engagement surfaces for the teeth of said eccentric gears and pinion, and a steering bar retaining surface spaced generally opposite and at a fixed distance from said pinion gear for engaging the side of said steering bar opposite from said pinion and holding said bar in engagement therewith, said steering bar being constructed and arranged to accommodate the translational movement of said steering bar produced by its bridging action between said gears which are eccentrically mounted on said wheel support shafts.

2. The vehicle of claim 1 wherein: said steering bar is contoured in one of the regions which engage said gears and retaining surface to accommodate rotational movement of said bar between said pinion and steering bar retaining surface.

3. The vehicle of claim 2 wherein: said contoured surface of said steering bar has two valleys on each side of the centered position of said steering bar.

4. The vehicle of claim 3 wherein: said tooth engagement surface of said steering bar is contoured.

5. The vehicle of claim 1 wherein: said steering bar is contoured to accommodate movement toward and away from said pinion as said gears rotate eccentrically.

6. The vehicle of claim 1 wherein: said teeth engagement surfaces comprise a plurality of spaced rollers.

7. The vehicle of claim 1 wherein: said tooth engagement surfaces are aligned in a flat plane and said eccentric gears are mounted for rotation within approximately one third of their radius from their geometric centers.

8. The vehicle of claim 7 in which said tooth engagement surfaces are made of chain held fixed to said steering bar.

9. The vehicle of claim 7 wherein: said steerable wheels are the front wheels of said vehicle and the rear wheels of said vehicle are spaced from said front wheels by a distance of approximately twice the transverse spacing of said front wheels.

10. The vehicle of claim 1 wherein: said tooth engagement surfaces of said steering bar are substantially in a straight line and the opposite side of said steering bar is contoured.

11. The vehicle of claim 10 wherein: said teeth engagement surfaces comprise roller chain.

12. The vehicle of claim 10 wherein: said steering bar contour has a depression in the centered position of said bar, and said pinion gear is spaced outwardly from the normal centerline of tooth engagement, so that the tolerance of tooth engagement is used to accommodate translational movement of said steering bar toward said pinion during initial movement of said bar out of said centered position.

13. The vehicle of claim 10 wherein: said opposite side of said steering bar has a depression in the centered position and two valleys on each side of said center depression.

* * * * *